April 14, 1959 L. KNAFF 2,882,163
METHOD OF MANUFACTURING DRY SAUSAGE AND CASING THEREFOR
Filed Feb. 18, 1957
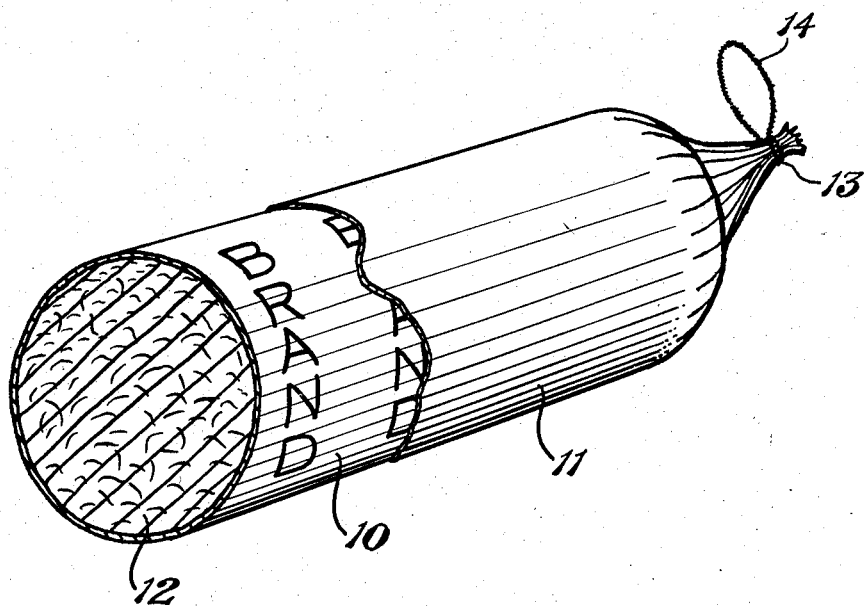
LEO KNAFF
INVENTOR.
BY R. G. Story
ATTORNEY

United States Patent Office 2,882,163
Patented Apr. 14, 1959

2,882,163

METHOD OF MANUFACTURING DRY SAUSAGE AND CASING THEREFOR

Leo Knaff, Chicago, Ill., assignor to Swift & Company, Chicago, Ill., a corporation of Illinois Application February 18, 1957, Serial No. 640,709

6 Claims. (Cl. 99—109)

The present invention relates to a method and a manufacture used in the production of dry sausage.

In the manufacture of dry sausage a chopped or ground meat, together with condiments, spices, etc., is stuffed into a casing. After the closing of the casing the sausage thus formed may or may not be smoked and is dried over a period of time. This method of producing a sausage is very ancient. Historically the casing used in the manufacture has been what is usually termed a "natural casing" to distinguish it from the artificial casings formed of various materials such as regenerated cellulose. During the drying operation, which may extend between about 30 and 120 days, depending upon the type of product being produced, the humidity conditions must be controlled in a manner so as to cause the sausage to dry uniformly, that is with the moisture that remains being uniformly distributed throughout the product. If a too rapid drying is attempted the product will "shell"; that is, it will dry on the outside with the inside remaining moist.

This dictates that particularly at the commencement of the drying period, when the percentage of moisture in the product is relatively high, the humidity in the drying rooms must be sufficiently high so as to prevent this shelling or overdrying of the exterior of the sausage. However, such conditions are conducive to mold growth on the product. If the mold growth is not too serious it usually can be washed off. However, the washing is an additional item of cost and the exterior of the product must be redried after washing and before the product can be shipped. Furthermore, a product that has once molded tends to mold again more quickly if the conditions are such as to promote the growth of mold. Extensive molding of the product during the drying period may produce a condition termed "rust" in the industry, which are blemishes that reduce the salable value of the product. Certain molds will produce a white discoloration commonly termed "frost" that appears on the surface of the product. The term "frost" also includes a whitish discoloration which may be caused by what is believed to be disodium phosphate formed by the hydrolysis of the protein in the sausage which diffuses to the surface of the sausage.

As previously mentioned, some of these conditions may be at least temporarily eliminated by washing but this adds to the cost of the product. If serious, permanent loss in value of the product results. The principal object of the present invention is to provide a method and manufacture to eliminate the extra cost occasioned by the coping with these problems and the loss in value of the product that may result from the problems. Following the practices of the present invention the product is in excellent condition when shipped from the point of manufacture, with no extensive labor being required to put it in that condition, at least compared with the labor involved in washing mold from sausages. Furthermore, the product will stay in a mold-free condition for a greater period of time after leaving the manufacturer than will a product produced by the conventional practices.

I have discovered that if the sausage mix is stuffed into a double-thickness casing, with the outer thickness being of a substantially larger diameter, generally on the order of 10% greater, than the diameter of the inner thickness, with the stuffing being carried out at a pressure sufficient to expand the inner thickness tightly against the outer thickness, that the undesirable conditions, if they occur, will be present on the outer thickness of the casing. The outer casing is formed of an impregnated fibrous material which is less resilient than the material used for the inner casing. Thus when the sausage dries the inner casing remains tight about the sausage, with the outer casing coming loose so that when the drying period is completed the outer casing is readily stripped from the sausage and the inner casing, with the mold and frost which are on the outer casing being thereby removed from the product to be shipped. Alternatively, the outer casing may be left on the sausage during the shipping process and removed by the retailer before display and sale to consumers. Excellent and by far the most effective results with respect to the elimination of mold and frost from the sausage in the form in which it is to be sold is obtained by the use of an inner casing of regenerated cellulose, with the outer casing being composed of a paper made from manila hemp impregnated with regenerated cellulose.

Regenerated cellulose casings have long been used in the manufacture of domestic sausages, such as frankfurters, etc. However, as far as I know the use of such casings has not been extended to the manufacture of dry sausage. It has been the belief in the industry that the characteristics of the dry sausages, particularly those of flavor, would not be obtained by the use of regenerated cellulose casings as compared with the use of natural casings. However, I have found that characteristic products can be produced by employing the double-thickness casing of my invention.

Interestingly enough there is a substantial saving in cost through the use of my double-thickness casing as compared with the use of natural casings generally employed. For example, at the present time a sewed beef middle used for smoked salamis is priced at about 24½ cents apiece. A sewed double-wall pork bung end used for Genoa salami is priced at about 62 cents apiece. A double-thickness casing of the type of my invention will cost 15 cents.

Double-walled casings have previously been used for various sausage products. As far as I know, all of such double-walled casings have been of a "natural" casing material with each of the walls being of substantially the same material. An example is the double-walled pork bung end mentioned in the preceding paragraph. These differ from the present invention in that the two will expand and shrink at the same rate. It is not practicable to strip the outer thickness of casing from the inner one to the extent and with the ease that this may be performed with the present invention. Furthermore, the inner wall will mold, which situation is prevented by following the practices of the present invention.

To prepare dry sausage following the practices of the present invention the inner thickness is slipped over the stuffing horn with the outer end of the inner thickness being closed as by tying or the like. The inner thickness is slipped over the stuffing horn as far as is permitted by the closed end of the inner thickness. The material of the inner thickness is a regenerated cellulose having a gauge of .004 inch. The outer thickness is then slipped over the stuffing horn and over the inner thickness with the outer end being tied. In tying the outer end a loop of the tying string may be provided for hanging the sausage or other means may be attached to the end of the outer thickness. The outer thickness is slipped over the horn as far as is permitted by the closed end of that thickness. As previously mentioned, the outer thickness is formed of a paper made from manila hemp impregnated with regenerated cellulose. The gauge of such material is .003 inch. The outer thickness has a diameter of approximately 110% of the diameter of the inner thickness. In other words, if the diameter of the inner thickness is 3 inches, the diameter of the outer thickness would be approximately 3.3 inches. The process just described is one of forming the double-thickness casing in situ. It will be readily apparent that a similar double-thickness casing could be manufactured beforehand and slipped onto the stuffing horn as a single unit.

The casing is then stuffed. Sufficient stuffing pressure is employed so as to expand the inner thickness tightly against the outer thickness. I prefer to use sufficient pressure to also expand the outer thickness to a limited extent. However, the important factor is to expand the inner thickness sufficiently so that the outer thickness fits tightly thereabout. The particular stuffing material and practices followed in stuffing my double-thickness casing corresponds to those presently in use and will be well-known to those skilled in the art. If one desires to acquaint himself with such practices it will be found discussed in chapter IX, "Manufacture of Dry Sausage," in the book "Sausage and Ready-to-Serve Meats," revised edition, published by the Institute of Meat Packing, The University of Chicago, Chicago, Illinois, 1953, the disclosure of which is incorporated herein by reference.

The remainder of the processing of the dry sausage is also conventional and will be known to those skilled in the art as well as being discussed in the foregoing publication. Briefly, the open end of the casing is closed by tying or the like after stuffing. If the sausage being manufactured is of a type to be smoked, the sausage is then smoked. Whether or not it is smoked it is thereafter put away to dry under controlled humidity and temperature conditions. After the drying period the sausage is ready to be merchandized. During the drying period the sausage and inner thickness will shrink away from the outer thickness. Following the practices of my invention the outer thickness will then be stripped from the inner thickness before shipment by the manufacturer, or it may be left on by the manufacturer to protect the sausage during shipment, in which case it will be removed by the retailer before displaying and selling the sausage to customers.

The drawing illustrates a portion of the stuffed double-thickness casing prior to the drying (with or without prior smoking) portion of the process. As mentioned, the inner thickness 10 in formed of a regenerated cellulose which may carry the brand name, manufacturer's name and address and other data necessary or desired for the merchandizing of the product. It has been expanded tightly against the outer thickness 11 by the pressure of the sausage material 12 stuffed within the inner thickness. The outer thickness 11 normally will bear none of the sales indicia since it is to be removed from the sausage before purchasers or consumers see the sausage. A string 13 has been employed to fasten the end of the outer thickness 11 in a closed position with the string being provided with a loop 14 to use in hanging the sausage during the drying and smoking operations.

Any mold or frost that forms during the drying process is confined to the outer thickness of my casing. Thus, when the outer thickness is stripped from the sausage before the sausage is shipped or sold the sausage has a fresh, clean, appearance. Furthermore, the inner thickness will actually stand up better after removal of the outer thickness and shipment by the manufacturer than will the conventional casing employed for dry sausage after that sausage is shipped by the manufacturer in good condition. For example, dry sausage handled in accordance with conventional practices will develop frost within 1 week after being packed for shipment, whereas, dry sausage produced in accordance with the present invention will not develop frost for 4 to 5 weeks after being packed for shipment. Thus the dry sausage produced in accordance with the present invention will remain in better condition longer after leaving the hands of the manufacturer than will dry sausage produced by conventional practices, even though care is used such as the washing of the sausage, etc., employed in conventional practices. If the outer thickness of the casing of the present invention is not removed from the sausage, the dry sausage will remain in good condition indefinitely.

With many dry sausages the sausage casing is wrapped with string at intervals, with the string being provided with a loop at one end or with other desired means to support the sausage during the drying and smoking operations. In other instances the sausage may be placed in a bag of cloth or the like after stuffing, with the bag being employed to support the sausage during the drying and smoking. These practices are rendered unnecessary by the present invention inasmuch as the outer thickness of my casing provides the support needed for the sausage during the drying and smoking. Obviously this is a monetary saving to the manufacturer. Labor in tying the string about the sausage or the cost of the cloth bag are eliminated. As previously mentioned, the cost of my double-thickness casing is actually less than the cost of casings conventionally being employed for dry sausage when taking into consideration only the cost of the material employed in the casing; thus, the elimination of the string tying or the bag form an even greater saving in the cost of manufacture of the dry sausage.

The foregoing detailed description is only for clearness of understanding and for the purpose of complying with 35 U.S.C. 112, and I do not desire to be limited to the exact details of construction shown and described for obvious modifications will occur to a person skilled in the art.

I claim:

1. The method of manufacturing dry sausage from a comminuted meat-containing mixture using a double-thickness artificial casing having an outer thickness of impregnated fibrous material of initially larger diameter of about 10% greater than the diameter of the inner artificial thickness of shrinkable material, said impregnated fibrous material being less resilient than said shrinkable material, including the steps of stuffing said mixture into said double-thickness casing under a pressure sufficient to expand the inner thickness of said casing tightly against the outer thickness, closing both ends of said casing, processing said sausage including the step of drying, and removing the outer thickness of said casing after said sausage is dried and before it is sold to the consumer.

2. In the process of manufacturing dry sausage from a sausage mix, the improvement comprising stuffing the sausage mix into an artificial double-thickness casing having an outer thickness of impregnated fibrous material of initially larger diameter of about 10% greater than the diameter of the inner artificial thickness of shrinkable material under a pressure sufficient to expand the inner thickness tightly against the outer thickness and removing the outer thickness after the dry sausage manufacturing process and before the sausage is sold to the consumer.

3. The method of manufacturing dry sausage from a comminuted meat-containing mixture using a double-thickness artificial casing having an outer thickness of impregnated fibrous material of initially larger diameter than the diameter of the inner artificial thickness of shrinkable material, said impregnated fibrous material being less resilient than said shrinkable material, including the steps of stuffing said mixture into said double-thickness casing under a pressure sufficient to expand the inner thickness of said casing tightly against the outer thickness, closing both ends of said casing, processing said sausage including the step of drying, and removing the outer thickness of said casing after said sausage is dried and before it is sold to the consumer.

4. A double-thickness artificial casing for use in the manufacture of dry sausage, said casing comprising an inner artificial thickness of shrinkable material and an outer thickness, said inner thickness being about 10% smaller in diameter than said outer thickness with said outer thickness being of an impregnated fibrous material whereby as said casing is stuffed the inner thickness may be expanded tightly against the outer thickness and the inner thickness will shrink away from the outer thickness as the casing is dried so that the outer thickness may be readily stripped away from the inner thickness.

5. A double-thickness casing for use in the manufacture of dry sausage, said casing comprising an inner thickness and an outer thickness, said inner thickness being a regenerated cellulose and about 10% smaller in diameter than said outer thickness with said outer thickness being of a manila hemp impregnated with a regenerated cellulose whereby as said casing is stuffed the inner thickness may be expanded tightly against the outer thickness and the inner thickness will shrink away from the outer thickness as the casing is dried so that the outer thickness may be readily stripped away from the inner thickness.

6. A double-thickness artificial casing for use in the manufacture of dry sausage, said casing comprising an artificial inner thickness and an outer thickness, said inner thickness being smaller in diameter than said outer thickness with said outer thickness being of an impregnated fibrous material and approximately 10% larger in diameter than the diameter of the smaller casing whereby as said casing is stuffed the inner thickness may be expanded tightly against the outer thickness and the inner thickness will shrink away from the outer thickness as the casing is dried so that the outer thickness may be readily stripped away from the inner thickness.

References Cited in the file of this patent

UNITED STATES PATENTS

| | | |
|---|---|---|
| 1,985,564 | Gall | Dec. 25, 1934 |
| 2,181,887 | Goodman | Dec. 5, 1939 |
| 2,182,188 | Walter | Dec. 5, 1939 |
| 2,201,457 | Smith et al. | May 21, 1940 |
| 2,423,861 | Vogt | July 15, 1947 |